Feb. 27, 1962  G. L. ST. CHARLES  3,023,332
ELECTRIC MOTOR CONSTRUCTION
Filed July 20, 1959  2 Sheets-Sheet 1

Inventor
Gilbert L. St. Charles
By
Attorney

Feb. 27, 1962

G. L. ST. CHARLES 3,023,332

ELECTRIC MOTOR CONSTRUCTION

Filed July 20, 1959

Inventor
Gilbert L. St. Charles
By Hamilton Jones
Attorney

3,023,332
ELECTRIC MOTOR CONSTRUCTION
Gilbert L. St. Charles, Milwaukee, Wis., assignor to John Oster Manufacturing Co., Milwaukee, Wis., a corporation of Wisconsin
Filed July 20, 1959, Ser. No. 828,099
3 Claims. (Cl. 310—254)

This invention relates to fractional horsepower electric motors and similar dynamoelectric machines, and refers more particularly to means for supporting and securing the bearings and stator core of a small dynamoelectric machine and for holding them in fixed relationship to one another, which means includes simple and inexpensive spring clips or straps that facilitate both assembly and disassembly of the elements thus secured.

More particularly, it is an object of this invention to provide a small dynamoelectric machine, such as a fractional horsepower motor used in an electric hair clipper or similar appliance, wherein the elements of the motor are supported on a simple frame which is both inexpensive and light in weight, and wherein the stator core and the rotor shaft bearings are secured to portions of the frame by unitary spring clips or straps which can be inexpensively manufactured and can be readily installed by relatively unskilled labor without the use of special tools or fixtures.

Another object of this invention is to provide bearing mounting means for the rotor shaft bearings of a small electric motor or the like comprising a bearing supporting block upon which a bearing member is seated, and a U-shaped spring clip straddling the bearing member and bearing supporting block and cooperating with the bearing supporting block to hold the bearing member in a fixed location but permitting the bearing member to have limited angular adjusting motion to enable it to align itself with a shaft journaled in it.

It is also a specific object of this invention to provide mounting means for the stator core of a small dynamoelectric machine, comprising elements substantially similar to those comprising the bearing mounting means described in the preceding statement of object, namely a block-like member providing a supporting surface for the stator core and a spring clip or strap embracing the stator core and block-like member under tension.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
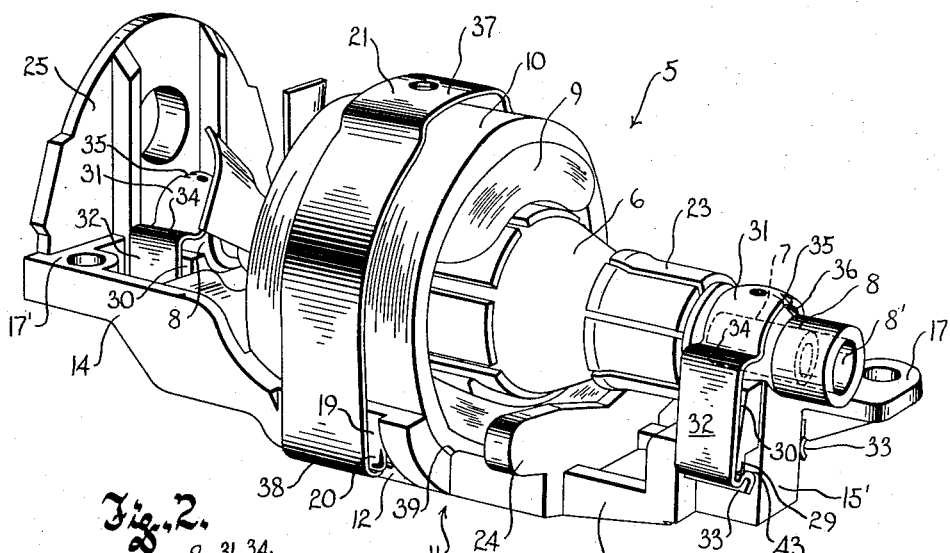
FIGURE 1 is a side perspective view of a small electric motor embodying the principles of this invention.
Figure 2:
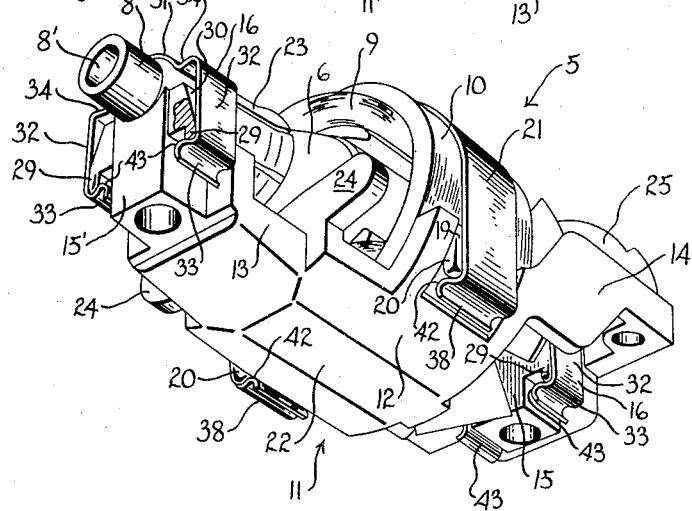
FIGURE 2 is a perspective view from below and to one side of the motor.
Figure 3:
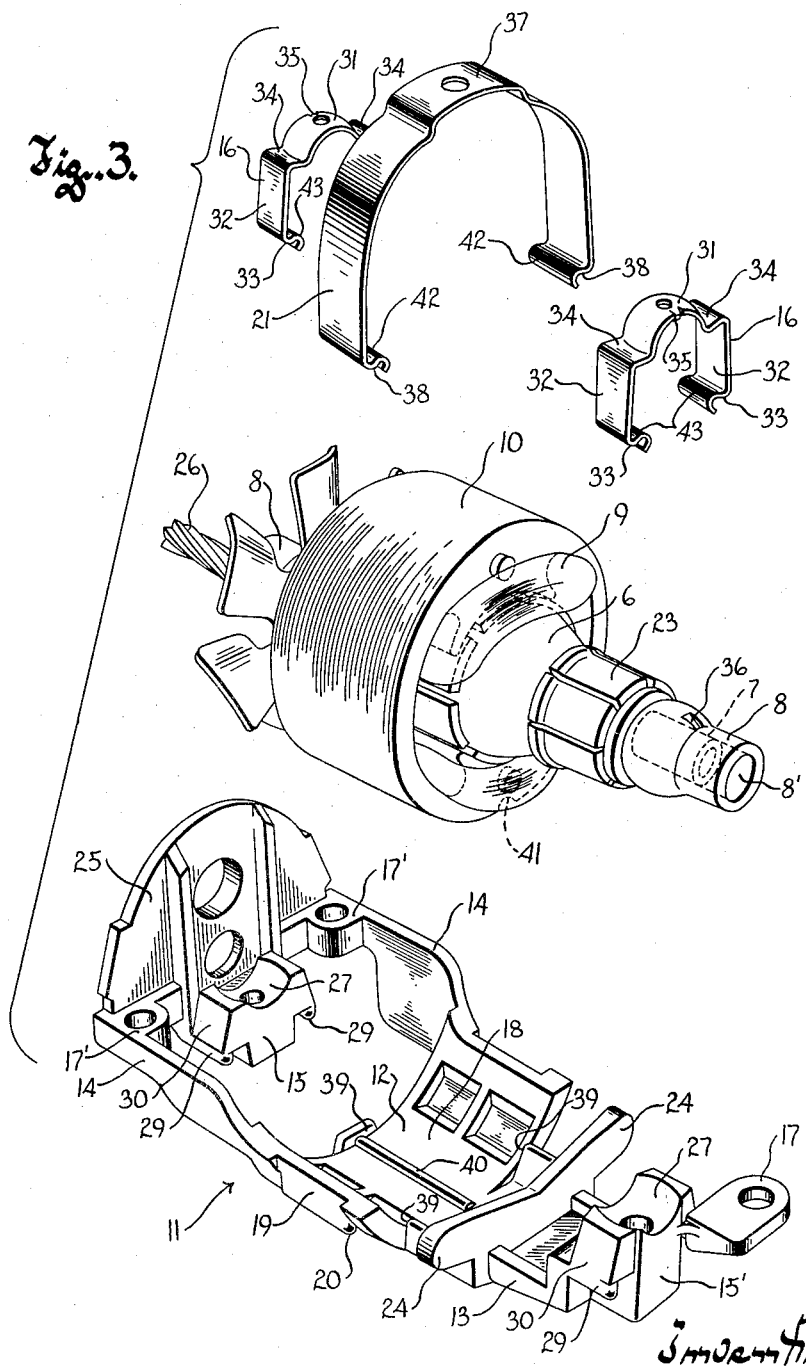
FIGURE 3 is an exploded perspective view of the motor of this invention showing the relationship of its elements to one another.

Referring now more particularly to the accompanying drawings, in which like numerals designate like parts throughout the several views, the numeral 5 designates generally a dynamoelectric machine embodying the principles of this invention and which for the purposes of illustration is shown as comprising a small fractional horsepower A.C.-D.C. motor of the type used in hair clippers. The motor has a wound rotor 6 and a coaxial shaft 7 extending in opposite directions from the rotor and journaled in axially spaced apart bearing members 8. Coaxially surrounding the rotor is a wound stator 9 having a core 10 of flatwise adjacent laminations, the outer surface of which is coaxially cylindrical.

The several components of the motor 5 are held in fixed relationship to one another on a frame 11 which comprises a medial stator core supporting portion 12, arms 13 and 14 extending in opposite axial directions from the stator core supporting portion, and bearing supporting blocks 15 and 15' at the remote ends of the arms. The bearing members 8 are secured to the bearing supporting blocks 15 and 15' by means of substantially U-shaped spring clips 16, described in detail hereinafter, and the stator core is held in place on the medial portion 12 of the frame by means of a substantially horseshoe-shaped spring clip or strap 21 which is also more fully described hereinafter.

Attention is directed to the fact that the frame 11 constitutes a more or less skeletonized support for the motor components and thus affords the dual advantage of insuring good cooling for the motor windings and providing a light weight motor. The latter advantage is particularly important in a hair clipper or similar hand held appliance which must be manipulated for considerable periods of time.

It will of course be understood that the motor as a whole may be suitably enclosed, as for example it may be housed in the handle portion of an electric clipper (not shown) in a manner which will be familiar to those skilled in the art. For the purpose of mounting the motor the frame may be provided with integral mounting lugs, such as the lug 17, and/or with mounting bosses such as those indicated at 17'. In any event, the frame lends itself readily to manufacture as a unitary casting or die casting of a suitable non-magnetic material, since the arms 13 and 14 can be made integral with the medial stator core supporting portion 12 at their axially inner ends and with the bearing supporting blocks 15 and 15' at their outer ends.

To describe the frame more specifically, its medial portion 12 has an upwardly facing concave surface 18 upon which the stator core rests and which is cylindrically curved about the shaft axis on a radius substantially equal to that of the cylindrical outer surface of the stator core so as to closely fit the latter. Side faces 19 extend substantially straight down from the concave stator supporting surface of the frame, and at its underside the medial portion of the frame has a pair of axially extending downwardly projecting ridges 20 adapted to be engaged by the strap 21 which secures the stator core to the frame. The outer face of each of the ridges 20 is preferably coplanar with the adjacent side face 19 of the medial portion of the frame and forms a downward extension thereof, and preferably the frame has a flat, horizontal bottom surface 22 disposed at a level beneath the ridges to provide a base upon which the entire frame can rest.

A single arm 13 extends in one axial direction from the medial portion of the frame, underlying and spaced below the commutator 23 and having the bearing supporting block 15' integral with and projecting upwardly from its outer end portion. If desired, suitable laterally projecting locating lugs 24 may be formed integrally with the arm 13 for aligning the motor with brush holders (not shown) secured to a fixed part of the machine in which the motor is installed; or, as will be readily apparent to those skilled in the art, suitable brush holder mountings could be formed integrally with the arm 13 of the frame.

A pair of laterally spaced apart arms 14 extend axially from the anti-commutator end of the medial portion of the frame, projecting endwise from the sides of the medial stator core supporting portion 12. These arms cooperate in supporting at their outer ends an integral transverse member 25 and the mounting lugs 17′, the latter being formed at the corners defined by the junctions of the arms and the transverse member. The transverse member 25 may support a bearing for a driven gear (not shown) cooperable with a drive gear 26 on the anti-commutator end portion of the rotor shaft, and the transverse member also supports the integral bearing supporting block 15, which corresponds in all material respects to the bearing supporting block 15′ at the commutator end of the frame.

Both of the bearing members 8 have substantially spherical outer surfaces, and the bearing in each is provided by a bore 8′, the axis of which intersects the center of the spherical outer surface. It will be understood that the bearing members are formed from a suitable material such as Babbitt metal.

The upper surface 27 of each bearing supporting block is spherically concave to match the spherical outer surface of the bearing member. At its underside each bearing supporting block has a pair of downwardly projecting ridges 29 which extend parallel to the shaft axis and are disposed adjacent to the side faces 30 of the bearing block; hence, like the ridges 20 on the medial stator core supporting portion of the frame, the ridges 29 on each bearing supporting block are spaced to opposite sides of a vertical plane lying on the shaft axis. The ridges 29 serve to hold in place the substantially U-shaped spring clips or straps 16 by which the bearing members are fastened to the bearing supporting blocks.

Each of the straps or clips 16 and 21 is stamped or otherwise formed as a unit from Phosphor bronze or similar spring material. The bight portion of each of the bearing member securement clips 16 has a spherically concave medial portion 31 which fits closely over the upper portion of the spherical outer surface of a bearing member 8, cooperating with the spherically concave upper surface 27 of the bearing supporting block to confine the bearing member in such a manner that it is constrained to limited angular motion by which it can readily align itself with the rotor shaft. The legs 32 of each clip 16 extend straight downwardly, substantially parallel to one another, and terminate at their bottoms in inturned hook-like tangs 33 which are adapted to engage around the ridges 29 at the underside of the bearing block. To enable the clip to exert a downward tension by which the bearing member is snugly confined against the concave upper surface of the bearing supporting block, the side faces 30 of the bearing supporting block are upwardly and inwardly inclined, while the bight portion of the clip includes short straight segments 34 at each side of the spherically concave medial portion thereof, providing lateral spacing between the upper portion of each leg 32 of the clip and its underlying bearing supporting block face 30. Also to insure tensioning of the clip around the bearing member the short straight segments 34 are inclined upwardly and outwardly from the spherical portion 31 of the bight of the clip.

Each bearing member is held against rotation by means of a spur 35 bent downwardly from the middle of the bight portion of the clip, at one marginal edge thereof, which engages in a groove or dimple 36 in the spherical surface of the bearing member.

The strap or clip 21 by which the stator core is secured to the frame is bent to a horseshoe shape, with its bight portion substantially semi-circular so as to closely embrace the outer cylindrical surface of the stator core. However, the medial portion of its bight is displaced radially outwardly, as at 37, so as to space it slightly from the underlying stator core surface and provide for resilient tensioning of the strap around the stator core.

Like the bearing clips 16, the stator core strap 21 has its legs terminating in inturned hook-like tangs 38 which engage behind the downwardly projecting ridges 20 beneath the medial stator core supporting portion of the frame.

It will be seen that assembly of the motor of this invention is extremely simple and rapid. The rotor is loosely placed inside the stator core, after the windings have been installed on both, and the bearing members 8 are slipped onto the end portion of the rotor shaft. This subassembly is then set in place on the frame. Proper positioning of the stator core is assured by abutments 39 at the ends of the medial stator core supporting surface of the frame, projecting above the surface 18 to engage the ends of the stator core and confine the same against axial displacement. A land 40, projecting above the surface 18 and extending axially along the center thereof, engages in a mating groove 41 opening to the outer cylindrical surface of the stator core to prevent rotational displacement of the latter. Hence proper placement of the stator on the frame is assure dwhen the stator core is held with its groove 41 lowermost, so that the land 40 is engaged in said groove, and the abutments 39 are snugly engaged with the ends of the stator core. The bearing members 8 readily position themselves correctly on the bearing supporting blocks 15 and 15′ because of the cooperation of their spherical surfaces with the spherically concave surfaces 27 on the frame, but the bearing members must of course have their notches 36 uppermost.

With the components thus aligned on the frame, the stator core retaining strap 21 may be installed over the stator core, straddling the same. The hook-like portion 38 on one leg of the strap is first engaged behind one of the ridges 20, and then the other hook-like portion is snapped over the other ridge, utilizing the resiliency of the material to do so. To facilitate engagement of the second hook-like portion 38 behind its cooperating ridge, the tip portions of the strap may be turned outwardly to provide cam-like rounded surfaces 42 which ride smoothly over the ridges.

The two bearing member retaining clips 16 may be installed next, the procedure for their installation being the same as that for the stator core strap 21, except that care must be taken to properly orient each clip 16 so that its tang 35 will engage in the notch 36 of the bearing member. The bearing member retaining clips may also have their tip portions turned outwardly to provide rounded surfaces 43 which ride smoothly over the ridges 29 as the clips are installed.

Obviously the motor can be disassembled very readily by merely snapping the hook portion of one leg of each of the clips or straps off to its cooperating ridge.

From the foregoing description taken together with the accompanying drawings it will be apparent that this invention provides a small dynamoelectric machine which, by reason of its light weight, is particularly suitable for small hand held appliances, and wherein a very few simple, inexpensive, and easily assembled members, comprising a skeletonized frame and three spring clips or straps, hold the components of the motor in securely assembled relationship.

What is claimed as my invention is:

1. In an electric motor having a rotor with a coaxial shaft projecting from both ends thereof and journaled in spaced apart coaxial bearings, and having a stator with a magnetically permeable core located between the bearings and coaxially embracing the rotor, means for holding the bearings and stator core in fixed coaxial relationship, said means comprising: a cast unitary frame having a medial portion which has a concave upper surface upon which the core of the stator rests, said medial portion of the frame having downwardly projecting axially extending ridges spaced below its upper surface and spaced opposite sides of a plane substantially normal to said upper surface and through the stator axis, said frame also having integral supporting arms extending axially in both directions from its medial portion, with integral bearing supporting blocks on the remote ends of the arms, each of said bearing supporting blocks having a concave upper surface upon which a bearing rests and a pair of downwardly projecting axially extending ridges spaced below its upper surface and spaced to opposite sides of said plane; a pair of inverted U-shaped spring clips, each having its legs extending downwardly alongside one of the bearing blocks and terminating in inturned hook-like tangs engaged with said ridges on the bearing block to hold the clip astraddle the bearing block with its bight portion over the bearing and confining it against the upper surface of the bearing block to secure the bearing against displacement relative to the bearing block; and a substantially horseshoe shaped spring strap embracing the stator core and extending downwardly along opposite sides of said medial portion of the frame, said strap having inturned hook-like portions near its ends engaged under the ridges on the medial portion of the frame to tension the strap downwardly upon the stator core so that the latter is held by the strap against the medial portion of the frame and thereby secured against movement relative thereto.

2. In an electric motor or the like having a frame, means for readily detachably mounting a bearing in a fixed location on the frame, said bearing mounting means comprising: a bearing member having a bearing therein and having a substantially spherical outside surface; a block on the frame having a spherically concave upper surface, side faces extending downwardly from the upper surface, and downwardly projecting ridges spaced below said upper surface of the block and adjacent and parallel to the side faces of the block; and a substantially U-shaped spring clip having a spherically concave bight portion adapted to cooperate with the upper surface of the block in embracing the bearing member, with a downwardly extending tang in its bight portion adapted to engage in a dimple in the spherical outer surface of the bearing member to prevent rotation of the bearing about its axis without interfering with limited angular motion of the bearing to provide for its alignment with a shaft journaled in the bearing, said clip also having hook-like members at the outer ends of its legs which are releasably engageable around said ridges on the block to hold the spring clip astraddle the bearing member and the block, and having substantially laterally extending segments connecting its spherical bight portion with its legs and normally spaced above the upper surface of the bearing block to tension the bight portion of the clip downwardly and thus confine the bearing member against the block.

3. The electric motor of claim 1, further characterized by cooperating abutment means on the core of the stator and on said medial portion of the frame, precluding both axial and rotational displacement of the stator core relative to the frame.

References Cited in the file of this patent
UNITED STATES PATENTS
2,781,467     Levine ---------------- Feb. 12, 1957